United States Patent [19]

Krijgsman

[11] Patent Number: 4,545,970

[45] Date of Patent: Oct. 8, 1985

[54] METHOD FOR THE FORMATION OF CALCIUM SILICATE AND THE RESULTING STRUCTURE

[76] Inventor: Pieter Krijgsman, Lindenhof, Groteweg 10, 8191JW Wapenveld, Hattem, Netherlands

[21] Appl. No.: 315,694

[22] Filed: Oct. 28, 1981

[51] Int. Cl.$^4$ ............................................. C01B 33/24
[52] U.S. Cl. ................................... 423/331; 106/120; 106/314
[58] Field of Search ................ 423/331; 106/120, 119, 106/314

[56] References Cited

U.S. PATENT DOCUMENTS

| | | | |
|---|---|---|---|
| 3,679,446 | 7/1972 | Kubo | 106/120 |
| 3,816,149 | 6/1974 | Zettel | 423/331 X |
| 4,131,638 | 12/1978 | Whitaker et al. | 106/120 X |
| 4,179,303 | 12/1979 | Shannon | 106/120 X |
| 4,238,240 | 12/1980 | Krijgsman | 106/120 |

FOREIGN PATENT DOCUMENTS 624441  5/1963  Belgium ............................. 423/331

*Primary Examiner*—William R. Dixon, Jr.
*Assistant Examiner*—Steven Capella
*Attorney, Agent, or Firm*—Alan H. MacPherson; Steven F. Caserza

[57] ABSTRACT

Calcium silicate is formed by a process wherein the viscosity of the calcium silicate produced in an autoclave is lowered by adding an acetate to the reaction constituents prior to the reaction of these constituents to form the calcium silicate crystals. In one embodiment, manganese acetate is added to comprise between approximately 1% and 3% by weight of the solids contents of the reaction constituents. The result is to lower the viscosity of the reaction product and thus to allow a higher solids content in the autoclave than heretofore commonly used. In one embodiment, water is added in-line to the reaction products as they are transferred from the autoclave to a holding vessel or from a holding vessel to a storage tank. In a further embodiment, fibrous material is added to the holding vessel prior to the transfer of the reaction product into the holding vessel, thus to reduce the amount of energy required to bring the pressure in the holding vessel up to a selected pressure beneath that of the autoclave.

8 Claims, No Drawings

METHOD FOR THE FORMATION OF CALCIUM SILICATE AND THE RESULTING STRUCTURE

BACKGROUND OF THE INVENTION

1. Field of the Invention

This invention relates to methods of forming calcium silicate and the resulting product.

2. Description of the Prior Art

Calcium silicate insulation is widely used, particularly for applications involving hot face temperatures above 800° F. A number of processes for forming calcium silicate insulation products are known. A summary of certain United States patents disclosing such processes is contained in the prior art section of U.S. Pat. No. 4,238,240. In one prior art process for the formation of calcium silicate, calcium hydroxide ($Ca(OH)_2$) and powdered quartz ($SiO_2$) are placed in an autoclave and mixed with water so as to form less than a given percent by weight (typically less than 7%) of the total weight of water in the autoclave. The contents of the autoclave are then heated to a selected temperature and pressure for a given period of time. The result is the formation of crystals of calcium silicate. Following the completion of the reaction which is determined when the calcium silicate crystals reach the desired size, (typically this reaction time is 55 minutes or greater) the reaction products are removed from the autoclave and further processed. In the process disclosed in U.S. Pat. No. 4,238,240, the reaction product is transferred from the autoclave to a holding vessel, the pressure in which is held beneath the pressure in the autoclave in a controlled manner during the transfer process. During the transfer process, the reaction products are sometimes passed through a heat exchanger where heat is extracted from the reaction products thereby to stabilize these products and to recover a portion of the energy used in heating the autoclave.

The solids content of the autoclave and the reaction time are two of the prime factors which determine the viscosity of the reaction products contained within the autoclave. Transfer of product from the autoclave to the holding vessel becomes progressively more difficult with increasing viscosity. For a given raw material formulation and processing conditions, viscosity increases with the solids content in the autoclave and also changes during the course of the chemical reaction. Studies show that the flow regime of the reaction constituents from the autoclave to the holding vessel is closely related to the pressure differential. It is common experience that the longer the reaction the more difficult it is to remove the reaction product in a controlled manner.

The economics of manufacturing calcium silicate are such that the greater the solid content of the reaction constituents in the autoclave, the more calcium silicate insulation of a given density can be fabricated from any given batch of reaction product. For given raw materials and processing conditions, the greater the solid content in the autoclave, the slower is the process of transferring the calcium silicate from the autoclave to the holding vessel and the greater the likelihood of flow blockage.

Following the transfer of the reaction product from the autoclave to a holding vessel, the reaction product is further modified, often by the addition of fibrous material to the reaction product and then is transferred to either filter presses or molds for the purpose of forming the calcium silicate reaction product into a shaped insulation.

It has also been proposed to add clay or the like to the reacted slurry of hydrated calcium silicates to overcome certain defects in molded calcium silicate products produced from the slurry. However, this method has been found unsatisfactory because it requires a longer molding time and the drying shrinkage of the molded product increases proportionately to the amount of additive such as clay. This method is discussed, for example, in British Patent Specification No. 1,462,242 filed Jan. 9, 1974. In the '242 specification, it is also disclosed that the reaction time required to form a calcium silicate hydrate by the hydrothermal reaction of a siliceous material with a calcareous material is shortened by adding caustic alkali to the reaction constituents. However, the '242 specification also points out that the degree of crystallinity of hydrated calcium silicates decreases in proportion to the amount of caustic alkali and that uniform crystals of calcium silicate hydrate could not be obtained. The resulting molded product from the slurry had increased drying shrinkage and very inferior resistance against high temperature.

SUMMARY OF THE INVENTION

This invention overcomes many of the limitations on the solid content of the reaction constituents in the autoclave. In accordance with this invention, an additive has been discovered which when added to the reaction constituents, such as silicon dioxide and calcium hydroxide (or calcium oxide) and water, in the autoclave greatly increases the amount of solids which can be placed in the autoclave while at the same time decreases the viscosity of the reaction products from that which would be expected following the completion of the reaction in the autoclave.

I have discovered that the addition of a chemical salt such as manganese acetate, to the autoclave reduces the viscosity of the reaction product (typically xonotlite). The addition of the acetate reduces or eliminates lumps in the reaction constituents and thereby results in a more uniform reaction which produces the best quality product. Other salts such a magnesium acetate and nickel acetate which accommodate in the reaction product in substantially the same way as manganese acetate can be used in place of manganese acetate.

DETAILED DESCRIPTION OF THE INVENTION

The process for the formation of calcium silicate insulation which is the basis for this invention is described in U.S. Pat. No. 4,238,240 issued Dec. 9, 1980. The contents of that patent are hereby incorporated herein by reference. In the process described in that patent, calcium hydroxide and synthetic silicon dioxide (amorphous silica) are placed in an autoclave and mixed with water so as to form less than about 7% by weight of the total weight of water in the autoclave. In accordance with this invention, an acetate compound, preferably manganese acetate is added to the reaction constituents there described. The addition of an acetate salt to the reaction constituents makes possible a higher solids content in the autoclave (up to about 10% percent) without the expected increase in viscosity. It is possible to use even a higher solids contact by suitable modification of the processing conditions and equipment. Accordingly, by increasing the solids content of the autoclave by, for example, a factor of one and a half, the efficiency of the process has been materially increased by increasing by the same factor the amount of calcium silicate insulation which can be formed at a given density using the reaction product.

Although the mechanism by which the acetate salt operates is not fully known at this time, it is believed that the favorable results occur for the following reasons. While the following explanation is theory only, it represents at this time the current understanding of the process by which the favorable results which have been observed are obtained.

When chemical salts such as manganese acetate, magnesium acetate and nickel acetate are placed in an autoclave, the acetate salt dissociates at about 105° C. into acetate anion (a manganese ion when manganese acetate is added). Each manganese ion replaces a calcium ion in the xonotlite lattice. The reason for choosing manganese acetate, magnesium acetate and nickel acetate for this purpose is that the diameters and valances of these ions are substantially equivalent to those of the calcium ion. Thus these ions have diameters in the range from 6 to 8 angstroms which are more or less equivalent to the diameter of the calcium ion. Furthermore, these compounds are very soluble and dissociate very rapidly when they are exposed to elevated temperatures, thus ensuring that the required ion becomes available for lattice substitution during the reaction. The acetate group attached to the manganese, magnesium or nickel ion, dissociates above 300° C. Because the hydrothermal reaction is carried out at a temperature of about 200° C. the acetate can remain "intact" throughout the reaction, possibly being converted to calcium acetate. The reaction between hydrated lime and silicon dioxide becomes significant above 137° C., the temperature at which silicon dioxide becomes soluble in water. The conditions at 137° C. therefore are ideal to have a substituting ion already available when the reaction starts to form minute crystals of xonotlite by the well recognized precursors of the crystalline calcium silicates; namely amorphous hydrates of calcium silicate. These crystals ultimately will grow into long chains at elevated pressures and their corresponding saturated steam temperatures.

It is also believed to be important that the addition of the acetate salts to the reaction constituents has another favorable effect in that it reduces the lumpiness of the reaction constituents. When silicon dioxide and hot water are mixed at approximately 60° C. in slightly alkaline water (as in the reaction process described, for example, in the above cited U.S. Pat. No. 4,238,240), the mixing of these two materials causes an increase in viscosity. The reason for this relates to the fact that the water used is often slightly alkaline with a pH value greater than 7. Alkalinity increases the viscosity in the mixing preparation vessel prior to insertion of the material into the autoclave. This increase in viscosity, however, should be avoided in the pre-reaction stage. High viscosity in this stage indicates the formation of lumps which, once they are transferred to the autoclave, may prevent the proper dispersion of the reaction constituents.

To obtain conditions which uniquely relate to the production of xonotlite, one must theoretically have all raw material available for the reaction. Lumps may prevent all material from being available and therefore are detrimental to the forming of a high quality end product. Adding the required chemical salt in accordance with this invention into the pre-reaction mixture of silicon dioxide and water reduces the viscosity. This is believed to happen because the silicon dioxide and water mixture is slightly alkaline, but the salt is acidic. Thus the resulting mixture assumes a pH value which is lower than 7 and becomes acidic, with a lower viscosity. Consequently, the dispersed silicon dioxide in water shows no signs of lump buildup which therefore allows an ideal reaction to take place.

On an empirical basis the amount of acetate added to the autoclave should be carefully chosen to be somewhere between 1% and 3% by weight of the solids content in the autoclave. Greater than 2% of the solids content in the autoclave yields no perceptible increase in the beneficial effects which have been discovered. A percentage lower than 1% by weight appears to have no effect whatsoever. Accordingly, the preferred percentage is somewhere between about 1% and 3% by weight of the solids content in the autoclave.

An additional change in the process described in U.S. Pat. No. 4,238,240 is believed advantageous. While the water from the heat exchanger used to remove energy from the reaction products formed in the autoclave is about 90° C., using 90° C. water from the heat exchanger for mixing the reactants for the next batch of constituents to be placed in the autoclave results particularly in the hydrated lime forming lumps. These lumps are believed to be caused from a reaction between the lime and hot water at 90° C. which appears to be a "meta-stable" mixture. These lumps have the same adverse effect on viscosity as mentioned above with respect to silicon dioxide and hot water in the premixing vessel. Such lumps could reduce the amount of lime available to form xonotlite and result in a product of less than adequate quality.

The process described in the U.S. Pat. No. 4,238,240 has been further modified in another way. As described in the preferred embodiment of the process, cellulose fibers (typically wood pulp) and mineral wool were added to the reaction products after they had been transferred to a holding vessel (herein called an antipressure vessel). By adding the fibrous materials to the antipressure vessel prior to the transfer of the reaction products into the antipressure vessel, the amount of compressed air required to fill the antipressure vessel is reduced by the volume of the fibrous material and water and the mixing process proceeds more rapidly. This saves energy because the volume of hot water and fibrous material can be subtracted from the total volume of the antipressure vessel and a smaller volume is therefore required to be filled with compressed air. Thus the energy consumption of the compressor is reduced.

Surprisingly, it has been discovered that the use of mineral wool in the fibrous material can be eliminated and rather merely a wood pulp solution used. The process as modified still requires the addition of about 5% by weight of the total solids content in the autoclave to the anti-pressure vessel in the form of cellulose fibers. Preferably, these fibers are derived from Usutu flash dried pulp, unbleached quality, supplied by the Springwood Cellulose Company of Coventry, England, but any other appropriate fiber can be used. The addition of 5% by weight of cellulose material and no mineral wool increases the flexural and compressive strength of the material without any increase in cost.

In view of the above description, it will be seen that by reducing the viscosity of the reaction products in the autoclave, the solids content of the autoclave can be increased resulting in a greater output per autoclave batch at given conditions. A finished molded calcium silicate insulation product of given density is obtained by then adding in-line hot water to the reaction products as they are transferred from the antipressure vessel into a holding or storage tank for holding the reacted molding liquor from the antipressure vessel. By increasing the solids content in the autoclave and then diluting after reaction this material with hot water in-line during the transfer of this material from the antipressure vessel to another storage tank, the density of the molded product can be reduced to as little as 90 kilograms/cubic meter. On a reproducible basis, calcium silicate insulation slabs with a density between 100 and 120 kilograms/cubic meter have been made. This is of advantage for certain applications. However, for the relatively high temperature applications for which the product made by this process is suited the thermal conductivity increases when the density decreases. The optimum density for minimal thermal conductivity appears to be about 170 kilograms/cubic meter and thus this density of calcium silicate material is the preferred density. This phenomenon apparently relates to the fact that a given crystal size is achieved from a solids content in the autoclave above at least 5% which behaves electrically (in the sense of the "dipole moment") in such a way that a thin layer of water is formed around the crystal. The crystal growth and water result in a phenomenon such that during pressing, (as in a filter press) and especially during drying, the macro structure of the xonotlite crystals will not collapse excessively when water is removed from the slab. Too large a crystal structure may collapse during drying with the result that excessive shrinkage of the insulation occurs. The "proper size" crystal, however, does not significantly collapse but rather the water surrounding the crystal merely evaporates during drying. Thus with a proper size crystal the calcium silicate insulation does not shrink excessively.

By adding manganese acetate to the autoclave increasing the solids content to about from 6.5% to 10% of the weight in the autoclave, shrinkage of the calcium silicate materal is reduced to less than 1.6% and in some instances to less than 1%. By adding manganese, apparently less relative movement of the calcium silicate crystal chains and the resulting product occurs due to the removal of water at elevated temperatures.

EXAMPLE 1

In one embodiment of this invention, 267.99 Kg of hydrated lime [$Ca(OH)_2$], 212.72 Kg of silicon dioxide [$SiO_2$] and 7.21 Kg of manganese acetate [$Ma(CH_3COO)_2 \cdot 4H_2O$] were mixed with 8000 liters of water in an autoclave. The lime-silica ratio on a molar basis was approximately 1.025:1 within a preferred range of 1.02 to 1.05. The reaction constituents were then heated from about 60° C. to 204° C. in about 100 minutes and then held at 204° C. (corresponding to 18 Bar) for 110 minutes. The reaction product was then transferred to a receiving vessel through a heat exchanger in about 13 minutes. The temperature of the reaction products upon emerging from the heat exchanger was 120° C. Calcium silicate insulation product 100 cm long by 50 cm wide by 5 cm thick was then formed using a filter press in a well-known manner (see, for example, the above-mentioned U.S. Pat. No. 4,238,240 for a description of the operation of one such press). The insulation was dried to a residual moisture content of about 3–5 percent and was then heated to 1000° C., for twentyfour (24) hours. The dimensional shrinkage of the block of insulation was 1.5% in length, 1.5% in width and 3.5% in thickness. Compressive strength was 800 $Kn/m^2$ flexural strength was 1100 $Kn/m^2$ and porosity was about 93.6%.

The reaction between lime and silica to make calcium silicate proceeds in several stages and is well-known. It is generally agreed that this reaction can be depicted as
$C + S \rightarrow C_2SH \rightarrow CSHI \rightarrow CSHII \rightarrow$ xonotlite/tobermorite where $C = CaO$, $S = SiO_2$, $H = H_2O$.

The reaction is time and temperature dependent. A description of this multi-step process is given in Canadian Pat. No. 601,124 issued July 5, 1960 on an application of Vander Linden, Column 3, line 41 to Column 4, line 11.

In one embodiment of this inventon, to make high temperature calcium silicate with good thermal shrinkage and a high compressive strength after heating, free silica is added at a stage where substantially only xonotlite is present; i.e., there is no free lime or free silica left from the reaction constituents. In another embodiment, the reaction product also included some tobermorite.

Free silica can be added at the CSHI stage or thereafter or at any stage in the manufacture when it will no longer significantly or appreciably react with the calcium silicate and this free silica will remain substantially free or unreacted during subsequent processing. However, in the preferred embodiment, free silica is added to the slurry after the formation of xonotlite. By adding free silica, a significant improvement in the thermal shrinkage of the molded insulation has been achieved. Consistently, the thermal shrinkage at 1000° C. for 24 hours is about 0.6% to 0.9%, about 1.2% at 1040° C. and about 3.0% at 1065° C. when free silica is added to the reaction product.

The effect of adding free silica is, contrary to expectation, beneficial in reducing the hydrothermal shrinkage of the resulting molded product. While the reason for this is not known, one possible theory is as follows. During the hydrothermal reaction between lime and silica, the process proceeds in a way which forms a variety of calcium silicates. If the reaction is of sufficiently long duration, the reaction product usually has an increasing preponderance of xonotlite and tobermorite.

In the manufacture of calcium silicate by reacting a stirred suspension of lime and silica in an autoclave and thereafter pressing the cooled slurry to which fibrous reinforcement may have been added, the changes occurring by the addition of free silica manifest themselves in two aspects.

Using the quality of raw materials specified in U.S. Pat. No. 4,238,240, it has been found that as the reaction proceeds, the drying shrinkage (defined as the shrinkage occurring when a wet slab is dried to a residual moisture content of 3–5%) initially is low, then reaches a maximum and finally falls once again to a low value as a function of reaction time.

The thermal shrinkage, measured as the mean percent length, breadth and width change when a dried sample is fired for 24 hours at 1000° C. (see details in ASTM, Pages 356–360, reapproved 1975) also decreases as reaction time increases.

Both the above relationships are by way of general trends; individual data may in some instances be contrary to these trends.

The time during which the chemical reaction between the lime and silica takes place—which is called the reaction time—is the largest fraction of an autoclave cycle time. Any improvement which enables the requisite quality of calcium silicate insulation to be produced by a shorter reaction time has obvious commercial value.

For a given "degree" of reaction (as measured by "reaction time" at a given temperature and pressure), typical values for thermal shrinkage at 1000° C. for 24 hours achieved by the process of this invention are as follows:

| "Degree of Reaction" (hours above 176° C.) | Thermal Shrinkage | |
|---|---|---|
| | With Manganese Addition | Without Manganese Addition |
| 1.94 | | 1.76% |
| 2.52 | | 2.29% |
| 2.52 | | 1.99% |
| 2.40 | | 2.13% |
| 1.94 | | 3.34% |
| 3.18 | | 2.89% |
| 2.13 | 5.14% | |
| 1.88 | 4.05% | |
| 1.34 | 4.83% | |
| 1.83 | 7.99% | |
| 2.50 | 5.55% | |
| 2.50 | 4.08% | |

The apparently deleterious effect on shrinkage of adding manganese acetate to the reaction constituents can be offset by including free silica in the slurry produced by the reaction process. Using the process described in U.S. Pat. No. 4,238,240, the free silica is added to the holding vessel at the same time as the wood pulp and/or mineral wool. It can alternatively be added to the autoclave after discharge of the reacted product—this being a convenient way to both add the silica to the slurry and to wash out the autoclave. It does not matter where or how the silica is added provided it is added after reaction and, of course, before molding. The quality of silica used is preferably at least the same quality as specified in U.S. Pat. No. 4,238,240. Adding this type of silica dust also lowers the thermal shrinkage of the material formed even when manganese acetate is not added to the reaction constituents.

The effects of adding free silica in accordance with this invention can be seen from the following examples.

EXAMPLE 2

The reaction product was prepared by reacting approximately equimolar amounts of lime and silica for 45 minutes at 150° C. and then subsequently for 3 hours above 176° C. Five percent (5%) by weight of wood pulp and mineral wool in equal amounts was added to the slurry produced by the reaction. No manganese acetate was added to the reaction constituents. The reaction product was molded and then calcined for 24 hours at 1000° C. Thermal shrinkage without any addition of free silica of three (3) separately reacted and prepared samples was 1.16%, 2.98% and 2.87%.

EXAMPLE 3

The reaction product was prepared in the same manner as in Example 2, but manganese acetate was added to the reaction constituents. The manganese acetate addition was at the level of 1.5%. Five percent (5%) wood pulp was added instead of equal amounts of wood pulp and mineral wool and ten percent (10%) by weight of free silica was added to the reaction product. However, this variation is not believed to have affected the result. The resulting reaction product was molded and then calcined for 24 hours at 1000° C. The results are as follows.

| Reaction | Thermal Shrinkage (24 hours at 1000° C.) | |
|---|---|---|
| | Without 10% Free Silica | With 10% Free Silica |
| 1 | 5.54% | 0.86% |
| 2 | 4.08% | 0.80% |
| 3 | 5.98% | 0.87% |
| 4 | 5.99% | |
| 5 | | 0.81% |
| 6 | | 0.73% |
| 7 | | 0.67% |
| 8 | | 0.73% |

Thus, the addition of free silica obviates the only known problem (excessive thermal shrinkage) arising from adding manganese compared to the shrinkage of slightly underreacted material made without manganese. It is effectively a way to upgrade quality of the molded reaction product.

A further desirable property is bestowed upon the insulation by the addition of free silica as described above. Whereas, most calcium silicate materials tend to soften after calcination, with added free silica, the compressive strength of the calcium silicate is effectively unchanged, as illustrated by the following data:

Compressive Strength (KiloNewtons per square meter)

Before heating to 1000° C. for 24 hours = 1350 $KN/m^2$.

After heating to 1000° C. for 24 hours = 1625 $KN/m^2$.

The price paid for these improvements is some sacrifice in the flexural strength (silica has no reinforcing property in this matrix). This is offset to some extent by using a long organic fiber in the molded product. Furthermore, a longer fiber dramatically improves the machining properties of the material.

In view of the above disclosure which is intended to be exemplary only and not limiting, other embodiments of this invention will be obvious to those skilled in the art.

What is claimed is:

1. In a process for the formation of calcium silicate from calcium hydroxide and silicon dioxide, the improvement comprising:
   adding an acetate to the reaction constituents prior to the reaction of these constituents to form the calcium silicate crystals wherein said acetate is selected from the group consisting of magnesium acetate, manganese acetate and nickel acetate.

2. The method of claim 1 wherein the material added to said reaction constituents is manganese acetate.

3. The method of claim 2 wherein said manganese acetate is added to said reaction constituents in a range between approximately 1 and 3% by weight of the solid contents of said reaction constituents.

4. The method of forming calcium silicate insulation in which reaction constituents comprising calcium hydroxide, silicon dioxide, water and an acetate selected from the group consisting of magnesium acetate, manganese acetate and nickel acetate, are reacted in an autoclave for a selected time, and transferred to a receiving vessel held in a controlled manner at a pressure beneath that of the autoclave during the transfer process characterized by adding fibrous material and chemically unreacted silica dust to the receiving vessel prior to the transfer of the reaction products from the autoclave to the receiving vessel, thereby to reduce the amount of energy required to bring the pressure in said receiving vessel up to a selected pressure beneath that in the autoclave.

5. The method of claim 4 wherein said fibrous material comprises a mixture of mineral wool and cellulose fibers, and free silica comprises high surface area dust or powder.

6. The method of claim 5 wherein said mineral wool comprises approximately 2.5% by weight of the calcium hydroxide and silicon dioxide in the autoclave and the cellulose fibers comprise approximately 2.5% by weight of the calcium hydroxide and silicon dioxide in the autoclave.

7. The method of claim 4 wherein said fibrous material comprises cellulose fibers.

8. The method claim 7 wherein said cellulose fibers comprise approximately 5% by weight of the solids content of the calcium hydroxide and silicon dioxide in the autoclave.

* * * * *